EVAPORANT SOURCE

Filed June 30, 1964

2 Sheets-Sheet 1

INVENTORS
GILBERT C. ROBERTS JR.
GIORGIO G. VIA
BY Frederick D. Poag
ATTORNEY

Sept. 6, 1966 G. C. ROBERTS, JR., ET AL 3,271,562

EVAPORANT SOURCE

Filed June 30, 1964 2 Sheets-Sheet 2

United States Patent Office 3,271,562
Patented Sept. 6, 1966

3,271,562
EVAPORANT SOURCE

Gilbert C. Roberts, Jr., Owego, N.Y., and Giorgio G. Via, Rockville, Md., assignors to International Business Machines Corporation, New York, N.Y., a corporation of New York Filed June 30, 1964, Ser. No. 379,307
8 Claims. (Cl. 219—275)

This invention relates to apparatus for carrying out material deposition processes, and more particularly to an improved, high capacity evaporant source for vacuum deposition equipment.

Considerable interest has developed in recent years in the use of vacuum deposition techniques in the manufacture of electronic circuitries and the like. Early equipments employed technology similar to that found in the art of optical goods manufacture and even equipments especially designed for the particular requirements of electronic circuitry fabrication were generally of the small experimental, bell jar variety. These equipments have not been, in general, suitable for depositing relatively thick films, such as employed in insulation in vacuum deposited electronic circuitry, on an economical, mass basis.

Accordingly, there has existed a need for improved high capacity evaporant sources particularly suited to quantity production of vacuum deposited electronic circuitries. At the same time, it is desired to preserve the control and perfection of result which are among the factors which lead the circuit designer to employ vacuum deposition techniques in the first place. Thus, the evaporant source should be capable of use in the production of films which are reliably pinhole free and particle free, the deposition rate should be accurately controllable, and other parameters such as stray radiation must be adequately controlled.

In accordance with the present invention, an improved high capacity source for an evaporant such as silicon monoxide is provided. In one configuration, it has a wide range of deposition rates controllable between zero and eight hundred angstroms per second and has a silicon monoxide charge capacity of one million angstroms, thus fitting it well to quantity production of fairly thick, for example ten thousand angstroms, silicon monoxide insulator films in electronic circuitries. These characteristics are achieved by a combination including a finned or a convoluted heater providing efficient heat transfer to a large charge of silicon monoxide while preserving close control over the entire evaporant mass. A separately heated baffle arrangement operates to prevent particle ejection from the evaporant mass and also tends to standardize the infrared radiation from the face of the evaporant mass. At the same time, cooling means are provided for the other portions of the apparatus such as the electrical connections and the housing so that stray radiation is minimized and high temperature operation of the evaporant mass itself is feasible.

Accordingly, an object of the present invention is to provide an improved high rate, high capacity evaporant source for use in vacuum deposition systems.

Another object of the invention is to provide an evaporant source as aforedescribed which is accurately controllable over a wide range of evaporation rates.

Still another object of the invention is to provide, in an improved evaporant source as aforesaid, effective, high capacity baffle means for preventing particle ejection from the evaporant mass.

Still another object of the invention is to provide an improved wide range, high capacity evaporant source apparatus as aforesaid, in which excess radiation of infrared energy is avoided.

Yet another object of the invention is to provide an improved high rate, high capacity evaporant source as aforedescribed which is easily reloadable, and is economically reconditionable, thus facilitating employment in high volume usage.

The foregoing and other objects, features and advantages of the invention will be apparent from the following more particular description of a preferred embodiment of the invention, as illustrated in the accompanying drawings.

Figures 1, 4:
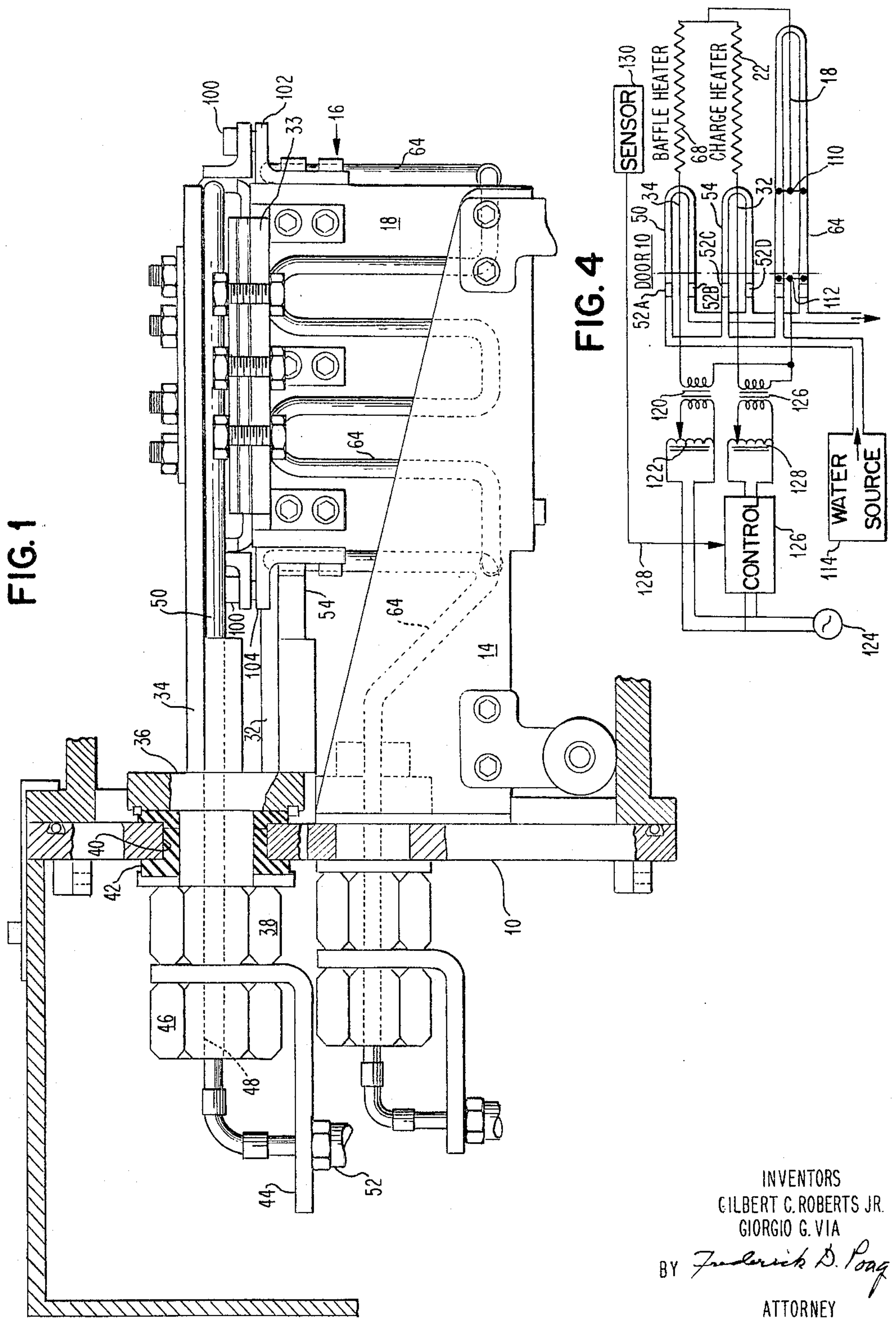
FIG. 1 is an elevation view, partly broken away, of an evaporant source apparatus in accordance with a preferred embodiment of the invention.
FIG. 4 is an electrical and coolant flow diagram applicable to the apparatus of FIG. 1.

Referring more particularly to FIG. 1, a preferred embodiment of apparatus in accordance with the invention may be mounted by a deposition source chamber door 10 in a large, production type, multi-station, evaporator apparatus, indicated fragmentarily at 12. The door mount of the apparatus provides for convenient servicing and replacement of the same and facilitates feedthrough of the electrical and cooling connections to the evaporant source of the invention without need of detachable couplings within the vacuum chamber of the apparatus. Accordingly, the door 10 carries a pair of brackets 14 which mount the evaporant source 16 itself and also is provided with feedthroughs for two electrical and three fluid coolant circuits as will be described in greater detail hereinafter.

Figure 2:
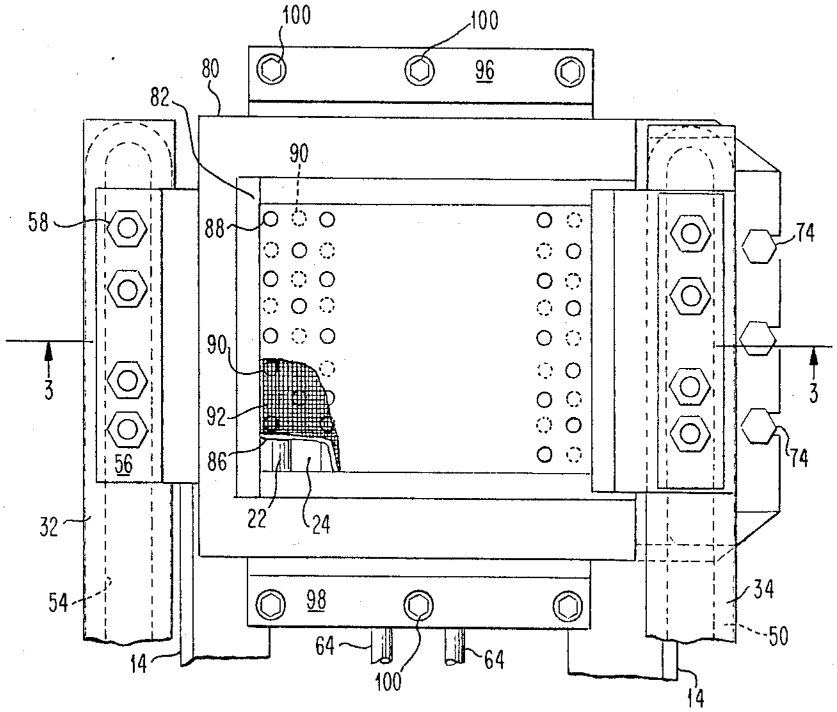
FIG. 2 is a fragmentary top plan view, turned 90° counterclockwise, of the apparatus of FIG. 1.
Figure 3:
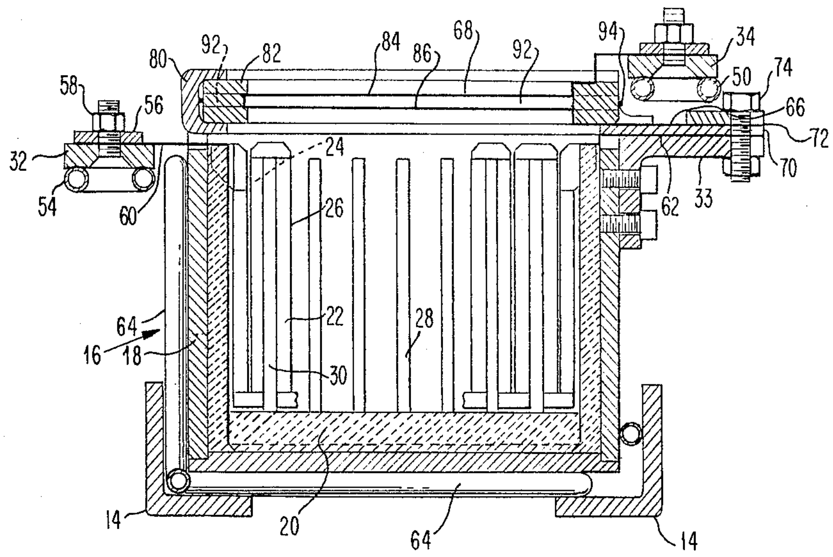
FIG. 3 is a sectional view taken about along line 3—3 of FIG. 2.

As shown more clearly in FIGS. 2 and 3, the evaporant source vessel 16 comprises an outer box 18 which may be of copper or other suitable thermally and electrically conductive material, having a lining 20 of electrically insulative refractory material such as magnesium silicate. Mounted within the liner 20 is a convoluted heating element 22 of suitable electrical resistance material such as tantalum, the convolutions of which form a number of fin-like configurations providing a plurality of pockets 24 for receiving a large charge of evaporant material, such as silicon monoxide. The heating element 22 is formed with flanges 26 to give it rigidity, and spacer means such as ribs 28 formed in the sides of the liner 20 and keying with the spaces 30 between the convolutions of the heating element provide mechanical support for the same.

Electrical connections to the heating element 26 are made by a bus 32, of copper or other suitable material, cantalevered from the door by one of the feedthrough connections, and by a flange fitting 33 on the conductive source vessel box. Referring again to FIG. 1 in conjunction with FIG. 2, the bus 32 is one of a pair including another bus 34, which supplies power to a baffle heater described more fully hereinafter. In FIG. 1 the charge heater supply bus 32 is largely hidden by other portions of the apparatus. It is substantially identical in construction to the bus bar 34 which is seen clearly in that figure, and accordingly a single description will suffice for both.

Referring then to the construction of bus bar 34, the bus bar is cantalever mounted by a feedthrough fitting 36 secured by a nut 38 in an aperture 40 in the door and insulated therefrom by material 42. The fitting 36 is of copper or other suitable electrically conductive material so as to provide a good electrical path from the bus 34 to a connection ear 44 mounted by the fitting 36, as by a nut 46. The fitting 36 is bored as indicated at 48 to provide cooling water feedthrough to and from a loop of tubing 50 of copper or other suitable material braised or otherwise secured to the underside of the bus 34 so as to cool the same. Electrically insulating couplings such as indicated at 52 are provided for electrical isolation of this cooling conduit from the rest of the cooling system, as will be described hereinafter.

As shown most clearly in FIG. 3 the charge heater supply bus bar 32, cooled by a conduit 54 similarly to the bus bar 34, clamps, by a plate 56 and fasteners 58, one end portion 60 of the heater 22. Thus, this heater connection tab portion 60 is in electrical communication with the connection ear of the bus 32. Ground connection is made at the other end connection portion 62 of the heater to the aforementioned ground connection flange 33 borne by the source outer box 18. This ground connection also serves for making connection to one terminal portion 66 of the baffle heater 68 (hereinafter more fully described), by means of clamp plates 70, 72 and fasteners 74.

Cooling means for the outer box 18 and the ground connection 64 are provided in the form of copper or other suitably electrically and thermally conductive cooling coil 64 braised or otherwise attached to the four sides and bottom of the copper box 18. This cooling coil 62 makes a good ground connection to external circuitry by means of a feedthrough 68 which may be in all respects similar to the feedthrough 36 above described, except that, since it is a ground connection it does not require insulation from the door 10.

The evaporant vessel is covered by a removable top portion constituting an evaporant exit baffle device. In the illustrated embodiment, as seen most clearly in FIGS. 2 and 3, the baffle comprises a metallic U-shaped frame 80 mounting a rectangular inner frame 82 of suitable insulating material such as magnesium silicate. The inner frame 82 is grooved to receive the baffle heater 68 which is formed from a strip of tantalum or other suitable heater material folded upon itself to provide an upper diaphragm 84 and a lower diaphragm 86. The upper diaphragm is perforated to provide a first array of holes 88 and the lower diaphragm is perforated to provide a second array of holes 90, in offset relation to the first array 88. Accordingly, the first and second arrays provide a tortuous passageway through the baffle for evaporant vapors. To avoid the possibility of mechanical ejection of large particles from the source pockets 24 through this tortuous passage, it is preferred that screening such as 100 mesh tantalum screening 92 be provided, tack welded to the lower diaphragm 86 so as to cover the holes 90 therein.

Spacer devices such as ceramic rods 92 are provided which maintain the diaphragms in spaced parallel relation for providing the desired path from one array of holes 90 to the other array 92. The insulating frame 82 may be made from several pieces held in assembled relation by a wire band or hoop 94 about the outside of that frame. This subassembly is removable through the open end of the U-shaped outer frame 80, so that the baffle is easily reconditionable. The baffle assembly is removable, for such reconditioning as well as for recharging and/or reconditioning the evaporant heater assembly. Thus, in the illustrated construction, the baffle outer frame 80 is mounted by angles 96, 98 attached by machine screws 100 to flanges 102, 104 mounted by the box 18.

The ends of the heater strip 68 forming the baffle diaphragms 84, 86 extend to provide connection portions whereby electrical current is passed through the baffle strip or ribbon 68 to heat it for preventing accumulation of evaporant deposits upon it. Electrical connection is made to the baffle for this purpose by the aforedescribed baffle heater bus 34 cantilevered by its insulated throughfitting 36 in the vacuum chamber door 10, and by the aforementioned connection to the flange 33 on the evaporant vessel box.

FIG. 4 shows in schematic form the separate electrical control of the evaporator heater and the baffle heater. It will be understood of course that the evaporant heater can be and usually is controlled by deposition rate or other suitable sensors not shown in FIGS. 1–3 but indicated in FIG. 4, as well as by other machine controls. FIG. 4 also shows schematically the coolant flow system.

In the scheme illustrated in FIG. 4 the charge heater 22 and the baffle heater 68 are connected to a common ground in conformity with the arrangement of FIGS. 1–3. As aforedescribed, this ground return is through the body of the box 18 and the cooling conduit 64 for that part. This interconnection between the box 18 and the cooling conduit 64 is indicated schematically at 110. The ground connection at the feedthrough 68 of the conduit 64 to the external electrical system of the apparatus outside the door 10 is indicated at 112. In contrast, the electrical isolation of the cooling conduits 50, 54 of the baffle heater bus 34 and the charge heater 32 is indicated by the schematic representation of insulating couplings 52A, 52B, 52C and 52D exemplified in FIG. 1 by the showing (at 52) of one of these insulators. As shown in the diagram of FIG. 4, the cooling conduits 50, 54 and 64 are connected to be supplied with cooling water from a suitable source 114.

The baffle heater bus bar 34 is connected via its connection ear 44 outside the door 10 for energization by the secondary winding of an isolating transformer 120, the primary of which is energized in a controllable manner by an auto-transformer 122 connected to a suitable source of A.C. power 124. Similarly, the connection ear of the feedthrough fitting for the bus bar 32 of the charge heater is connected for energization by an isolating transformer 126 which is also supplied through an adjustable auto transformer 128. However, in the illustrated arrangement, there is interposed between the power supply 124 and the auto transformer 128 a suitable control 126, which may comprise a saturable reactor having an input control 128 responsive to an evaporation rate sensor 130 which may be of the ion gage or other suitable type, located for intercepting a sampling of the evaporant stream emanating through the baffle from the source apparatus of the invention.

In one example, an evaporator in accordance with the invention had an evaporant vessel box with a liner having interior dimensions approximately 2⅞ x 3 x 3 inches, a source heater made of 3 mil tantalum 2⅞ inches wide and 37½ inches long folded to form six pockets each ⅜ x 2⅞ x 3 inches. The baffle frame had an interior opening of 2⅞ x 3 inches and a baffle heater made of 3 mil tantalum and having about forty-two $\frac{3}{16}$ inch perforations in each of its diaphragms, with 100 mesh tantalum screening spot welded to the top surface of the bottom diaphragm. A 3.5 k.v.a. power supply was provided for the charge heater and a 2.0 k.v.a. power supply for the baffle. This device yielded a deposition rate which was controllable between zero and eight hundred angstroms per second at source to deposition substrate distance of 12 inches. It was designed for evaporation of silicon monoxide at a twenty-four inch source-to-substrate distance and had a capacity of 264 grams of SiO which yielded one million angstroms per charge.

Larger configurations, such as the eight pocket version shown in the drawings yielded up to 800 A./sec. at twenty-four inches source-to-substrate distance, and, using a granulated SiO charge, had a capacity of over 500 grams of SiO, yielding about one million angstroms deposition per charge at that distance.

Typical operating temperatures, in either version, for the baffle and charge heaters are about 1450° C. and 1380° C. respectively. The baffle spacer rods 92 may be of commercially available thermo-couple tubing of a suitable ceramic material. The fold 132 of the baffle heater 68 may be apertured to receive the rods 92, as required.

The illustrated evaporant source is easily rechargable by opening the door and removing the baffle-cover device of the evaporant vessel. Replacement of the tantalum charge heater is a simple matter, since it is fastened only at its electrical connections. Similarly, the baffle heater can be replaced with facility by disassembly of its frame.

Although the charge capacity is large, the entire charge mass is in close association with the charge heater for efficient and controlled evaporation at high rates. So also, the baffle has large capacity and yet each individual orifice of that part is small and well protected against particle ejection.

Since means are provided for cooling the connection buses and the evaporant source box, the only substantial radiation of infrared energy from the evaporant source of the invention is by the baffle. Since the baffle heater is separately controllable, the baffle can be maintained at a substantially constant or otherwise predetermined temperature despite changes in the operating temperature of the evaporant source charge heater, whereby control of the vacuum deposition process parameters is facilitated.

While the invention has been particularly shown and described with reference to preferred embodiments thereof, it will be understood by those skilled in the art that various changes in form and details may be made therein without departing from the spirit and scope of the invention.

What is claimed is:

1. In a vacuum deposition apparatus, an evaporant source comprising
- an evaporant charge vessel,
- said vessel comprising a box structure and an evaporant charge heater mounted by said box structure,
- said heater comprising a vertically finned structure of resistance metal formed to provide a plurality of vertically opening pockets,
- and means on said heater and on said box structure for maintaining the pocketed configuration of said heater,
- and baffle means disposed to intercept vapors emanating from said vessel.

2. In a vacuum deposition apparatus, an evaporant source comprising
- a box and an insulating liner within said box,
- an evaporant change heater mounted by said liner,
- said heater comprising an elongate strip of resistance metal folded to form a plurality of vertically opening pockets,
- means on said heater and on said lining for maintaining the pocketed configuration of said heater,
- and baffle means disposed to intercept vapors emanating from said box.

3. Apparatus in accordance with claim 2, wherein said baffle means comprises a cover for said box.

4. In a vacuum deposition apparatus, an evaporant source comprising
- an evaporant charge vessel,
- said vessel comprising a box structure and an evaporant charge heater mounted by said box structure,
- said heater comprising a vertically finned structure of resistance metal formed to provide a plurality of vertically opening pockets,
- and means on said heater and on said box structure for maintaining the pocketed configuration of said heater,

- and baffle means located to intercept vapors from said box,
- said baffle means comprising a strip of resistance metal folded upon itself and means for maintaining the folded portions of the same in spaced parallel relation,
- said folded portions being perforated in an offset manner with respect to each other,
- and electrical connections for said strip for energizing the same as a heater.

5. In a vacuum deposition apparatus, an evaporant source comprising
- a box of electrically and thermally conductive material,
- an electrically insulating liner within said box,
- an evaporant charge heater mounted by said liner,
- said heater comprising an elongate strip of resistance metal folded to form a plurality of vertically opening pockets, means on said heater and on said lining for maintaining the pocketed configuration of said heater,
- and a cover for said box comprising a baffled exit means comprising a strip member of resistance metal folded upon itself and
- a refractory insulative frame receiving said member and comprising means for maintaining the folded portions of the same in spaced parallel relation,
- said folded portions being perforated in an offset manner with respect to each other to provide a tortuous exit path.

6. In a vacuum deposition apparatus, an evaporant source comprising
- a box of electrically and thermally conductive material,
- an electrically insulating liner within said box,
- an evaporant charge heater mounted by said liner,
- said heater comprising an elongate strip of resistance metal folded to form a plurality of vertically opening pockets, means on said heater and on said lining for maintaining the pocketed configuration of said heater,
- a cover for said box comprising a baffled exit means comprising a heater member formed by a strip of resistance metal folded upon itself and a refractory insulative frame receiving said member and comprising means for maintaining the folded portions of the same in spaced parallel relation,
- said folded portions being perforated in an offset manner with respect to each other, and the lower of said portions being provided with a mesh screen,
- separate circuit electrical connections for said charge heater and said baffle heater,
- and separate coolant conduit means for said electrical connections, one of said electrical connections comprising said box.

7. In a vacuum deposition apparatus, an evaporant source comprising
- a box of electrically and thermally conductive material,
- an electrically insulating refractory liner within said box,
- an evaporant charge heater mounted by said liner,
- said heater comprising an elongate strip of sheet tantalum folded to form a plurality of vertically opening pockets, flange means on said heater and rib means on said lining for maintaining the pocketed configuration of said heater,
- a cover for said box comprising a baffled exit means comprising a heater member formed by a strip of sheet tantalum folded upon itself and a refractory insulative frame receiving said member and comprising refractory spacer means for maintaining the folded portions of the same in spaced parallel relation,
- said folded portions being perforated in an offset manner with respect to each other, and the lower of said portions being provided with a tantalum mesh screen, separate circuit electrical connections for said charge heater and said baffle heater, and separate coolant conduit means for said electrical connections, one of said electrical connections comprising said box.

8. In a vacuum deposition apparatus, an evaporant source comprising an evaporant charge vessel, said vessel comprising a box structure and an evaporant charge heater mounted by said box structure, said heater comprising a finned structure of resistance metal arranged in said box structure to provide a plurality of pockets in said finned structure opening from said box structure, and baffle means disposed to intercept vapors emanating from said pockets of said vessel.

References Cited by the Examiner

UNITED STATES PATENTS

| | | | |
|---|---|---|---|
| 2,675,973 | 4/1954 | Thorington -------- | 118—49 X |
| 3,104,178 | 9/1963 | Silva ----------- | 118—49.1 X |

OTHER REFERENCES

Weed, D. S.: Evaporation Boat for Silicon Monoxide, IBM Technical Disclosure Bulletin, vol. 2, No. 3, pp. 27 and 28, October 1959.

RICHARD M. WOOD, *Primary Examiner.*

C. L. ALBRITTON, *Assistant Examiner.*